United States Patent
Viglione

(10) Patent No.: US 8,333,521 B2
(45) Date of Patent: Dec. 18, 2012

(54) SHUTTER ASSEMBLY WITH ROTATING MAGNET

(75) Inventor: David Viglione, Rochester, NY (US)

(73) Assignee: VA, Inc., Rochester, NY (US)

( * ) Notice: Subject to any disclaimer, the term of this patent is extended or adjusted under 35 U.S.C. 154(b) by 228 days.

(21) Appl. No.: 12/752,949

(22) Filed: Apr. 1, 2010

(65) Prior Publication Data

US 2011/0242636 A1  Oct. 6, 2011

(51) Int. Cl.
  G03B 9/10 (2006.01)
  G03B 9/08 (2006.01)
  G02F 1/00 (2006.01)
(52) U.S. Cl. ......... 396/493; 396/455; 396/457; 348/363
(58) Field of Classification Search .................. 396/493, 396/497, 455, 457; 348/363, 367
  See application file for complete search history.

(56) References Cited

U.S. PATENT DOCUMENTS

| | | |
|---|---|---|
| 3,533,345 A | 10/1970 | Starp |
| 3,595,553 A | 7/1971 | Vincent |
| 3,664,251 A | 5/1972 | Vincent |
| 3,804,506 A | 4/1974 | Fletcher et al. |
| 4,051,499 A | 9/1977 | Kondo |
| 4,060,313 A | 11/1977 | Kondo |
| 4,121,235 A | 10/1978 | Fujita et al. |
| 4,265,530 A | 5/1981 | Petersen |
| 4,466,723 A | 8/1984 | Ikari et al. |
| 4,702,583 A | 10/1987 | Yoshino et al. |
| 4,724,452 A | 2/1988 | Mody et al. |
| 4,772,904 A | 9/1988 | Otsuka et al. |
| 4,881,093 A | 11/1989 | Dowe |
| 4,972,217 A | 11/1990 | Gaewsky |
| 5,117,137 A | 5/1992 | Kobayashi |
| 5,135,089 A | 8/1992 | Kovac |
| 5,173,728 A | 12/1992 | Sangregory et al. |
| 5,337,110 A | 8/1994 | Dowe |
| 5,489,959 A | 2/1996 | Akada |
| 5,555,059 A | 9/1996 | Seo et al. |
| 5,705,873 A | 1/1998 | Sato |
| 6,033,131 A | 3/2000 | Ghosh et al. |
| 6,652,165 B1 | 11/2003 | Pasquarella et al. |
| 6,714,733 B2 | 3/2004 | Kobayashi |
| 6,806,985 B1 | 10/2004 | Devenyi |
| 7,104,707 B2 | 9/2006 | Miyawaki |

(Continued)

FOREIGN PATENT DOCUMENTS

GB  2235541 A  3/1991

(Continued)

OTHER PUBLICATIONS

McLeod, et al.: Advanced electro-mechanical micro-shutters for thermal infrared night vision imaging and targeting systems, pp. 1-10.

(Continued)

*Primary Examiner* — Rochelle-Ann J Blackman
(74) *Attorney, Agent, or Firm* — Finnegan, Henderson, Farabow, Garrett & Dunner LLP

(57) ABSTRACT

A shutter assembly includes a base having a stop and a central aperture, a permanent magnet rotatably mounted on the base, and a shutter blade directly mounted on the magnet and configured to move between an open position exposing the aperture and a closed position blocking the aperture. The magnet contacts the stop in the open and closed positions.

26 Claims, 5 Drawing Sheets

U.S. PATENT DOCUMENTS

| | | |
|---|---|---|
| 7,259,922 B2 | 8/2007 | Fukasawa |
| 2003/0062788 A1 | 4/2003 | Aoshima |
| 2004/0008425 A1 | 1/2004 | Miyawaki |
| 2004/0258405 A1 | 12/2004 | Shiratori et al. |
| 2005/0041137 A1 | 2/2005 | Ezawa et al. |
| 2007/0110432 A1 | 5/2007 | Viglione et al. |
| 2007/0172231 A1 | 7/2007 | Durfee |
| 2009/0190918 A1* | 7/2009 | Chang .......................... 396/463 |
| 2009/0232489 A1 | 9/2009 | Viglione |

FOREIGN PATENT DOCUMENTS

| | | |
|---|---|---|
| JP | 2009-501357 | 1/2009 |
| JP | 2009-533704 | 9/2009 |
| KR | 10-2007-0050534 | 5/2007 |
| WO | 2007089588 A2 | 8/2007 |

OTHER PUBLICATIONS

Melles Griot Custom Shutters, www.mellesgriot.com. pp. 1-2.

Melexis: MLX90316 Rotary Position Sensor IC, 3 pages www.melexis.com/Sensor_ICs_Hall_effect/Triaxis_Hall_ICs/MLX90316_566.aspx.

Office Action in corresponding Chinese Patent Application No, 200680050297.6, along with an English language Summary of the Office Action. (7 pages).

Supplementary European Search Report from European Patent Application, No. EP 06839850.2, dated Jun. 8, 2009.

International Search Report and Written Opinion dated Mar. 28, 2008 re International Application No. PCT/US06/60186 filed Nov. 13, 2006—8 pages.

PCT—Notification of Transmittal of the International Search Report and the Written Opinion of the International Searching Authority, or the Declaration; mailed Jan. 4, 2010.

PCT—International Search Report issued in corresponding International Application No. PCT/US2009/036872 (3 pages).

PCT—Written Opinion of the International Searching Authority issued in corresponding International Application No. PCT/US2009/036872 (5 pages).

USPTO Office Action in corresponding U.S. Appl. No. 12/046,958; mailed Jan. 6, 2010 (10 pages).

Rogers Corporation: PORON® Cellular Urethane Foams, Publ. #17-034, Oct. 1999 (2 pages).

Notification of Transmittal, International Search Report, and Written Opinion dated Dec. 26, 2011, in International Application No. PCT/US2011/030272, filed Mar. 29, 2011, (10 pages).

* cited by examiner

SHUTTER ASSEMBLY WITH ROTATING MAGNET

BACKGROUND OF THE INVENTION

1. Field of the Invention

The present invention relates generally to shutter assemblies and more particularly to photographic-type shutter assemblies that rely on electromagnetic forces to open and close.

2. Description of Related Art

Electrically operated lens shutters used in various types of photographic and laboratory equipment are well known in the art. Lens shutters especially adapted for high speed opening and closing can operate in fractions of a second. An open/close cycle can take place in 30-40 milliseconds or less and repeated cycles at frequencies of 30 cycles per second are common.

Lens shutters generally are of two types. In one type, a so-called "guillotine" shutter has one or two thin, metal blades or leaves arranged to cover a lens opening. Pivot connections allow each blade to swing between a closed position where the blades cover the lens opening and an open position where the blades are drawn aside from the lens opening.

In a second type of shutter, a plurality of pivotally mounted blades are arranged around the lens opening. Each blade is connected to a rotatable drive ring. In the operation of these shutters, the rotation of the drive ring in one direction causes the blades to swing in unison to an open position. Counter rotation of the ring swings the blades to a closed position over the lens opening after exposure. Generally a linear electric motor is used to activate the shutter. When activated, the linear motor pulls on a lever arm that rotates the drive ring to open the shutter. To close the shutter the motor is deactivated and a spring causes the counter rotation of the drive ring to close the shutter. As noted above, shutters of this sort can cycle open and close 30 times per second.

In some applications, however, space is limited. Space limitations, particularly in the region of the shutter opening, dictate the parameters of size and placement of components for opening and closing the shutter. For example, components placed near the shutter opening must have a relatively low profile so as not to interfere with the cone angle of the light passing through the open shutter. Space limitations also complicate the substitution of one shutter assembly for another as in changing shutter size while maintaining the same base structure.

As noted above, existing shutter assemblies typically mechanically couple a linear electric motor to the shutter for opening and closing the lens opening. However, for proper operation, particularly at high speeds, the mechanical linkage must be precisely made and the movement of the linkage must be dampened by relatively large dampening assemblies.

Alternatively, other known shutter assemblies may utilize electro-magnetic energy to open and close the shutter. For example, such assemblies may include a permanent magnet disposed on a drive ring and a pair of spaced solenoids disposed above the permanent magnet. A polarity of an operative end of the first solenoid can be opposite that of an operative end of the second solenoid, such that the permanent magnet is attracted to one of the solenoids and repelled by the other. The solenoids can be energized to switch polarities, to effectuate a movement of the permanent magnet between a first position proximate the first solenoid and a second position proximate the second solenoid.

Such assemblies may be configured to open and close at relatively high speeds without damaging the shutter blades. However, such assemblies generally require that the solenoid be situated in a tier or layer of the shutter assembly separate from, and either above or below, the permanent magnet. This necessarily increases the overall thickness of the shutter assembly.

Accordingly, the disclosed system and method are directed towards overcoming one or more of the problems set forth above.

BRIEF SUMMARY OF THE INVENTION

In an exemplary embodiment of the present disclosure, a shutter assembly includes a base having a stop and a central aperture, a permanent magnet rotatably mounted on the base, and a shutter blade directly mounted on the magnet and configured to move between an open position exposing the aperture and a closed position blocking the aperture. In such an exemplary embodiment, the magnet contacts the stop in the open and closed positions.

In another exemplary embodiment of the present disclosure, a shutter assembly includes a base having a central aperture, a rotating permanent magnet in communication with the base such that contact between the magnet and the base limits rotation of the magnet, and a shutter blade mounted on the magnet and configured to move between an open position exposing the aperture and a closed position blocking the aperture.

In a further exemplary embodiment of the present disclosure, a shutter assembly includes a base defining a central aperture and a pin extending substantially perpendicular to the base, a permanent magnet pivotably mounted on the pin, and a shutter blade mounted on the magnet and movable between an open position exposing the aperture and a closed position blocking the aperture. In such an exemplary embodiment, the magnet impacts the base at the open and closed positions.

DETAILED DESCRIPTION OF THE INVENTION

Figure 1:
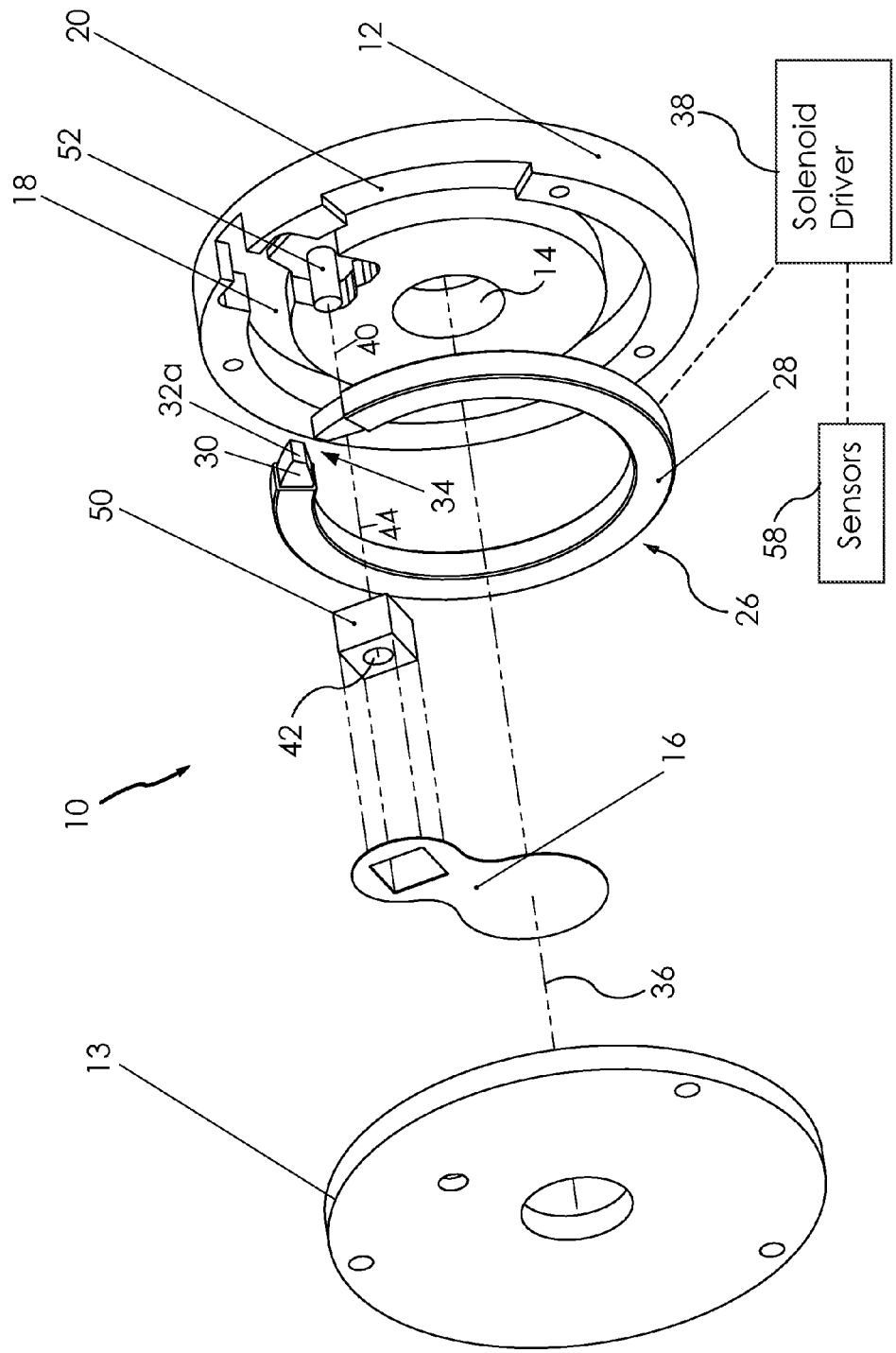
FIG. 1 is an exploded view of a shutter assembly according to an exemplary embodiment of the present disclosure.

FIG. 1 shows a shutter assembly 10 according to an exemplary embodiment of the present disclosure. The shutter assembly 10 is of a type that can be used in any photographic, scientific or calibration application that requires one or more cycles of opening and closing of a shutter opening by driving one or more shutter blades across the opening. In describing the shutter assemblies 10, 100 disclosed herein, like item numbers have been used to identify like parts.

The shutter assembly 10 includes a base plate 12 defining a shutter opening 14. In an exemplary embodiment, the shutter opening 14 may be a substantially circular aperture having a central axis 36. The shutter assembly 10 may further include at least one of a solenoid 26, a permanent magnet 50, a shutter blade 16, and a cover 13. The cover 13 may be structurally similar to the base plate 12 and may be permanently or removably connected to the base plate 12.

The base plate 12 of the shutter assembly 10 may be substantially disc-shaped, substantially square, substantially rectangular, and/or any other shape known in the art. The base plate 12 may define one or more channels 18 within which components of the shutter assembly 10 may be disposed. For example, one or more channels 18 of the base plate 12 may support, accept, and/or otherwise house the solenoid 26 and/or the magnet 50. The base plate 12 may be made from any metals, plastics, alloys, polymers, and/or other materials known in the art, and at least a portion of the base plate 12 may be made from a substantially non-magnetic metal or alloy. It may be desirable for the base plate 12 to be as thin as possible to as to minimize the overall dimensions of the shutter assembly 10.

The base plate 12 may define one or more pivot pins 52 extending substantially perpendicularly therefrom. Alternatively, the one or more pivot pins 52 may be rigidly connected to the base plate 12 by any known means. In an exemplary embodiment, the pivot pin 52 may be substantially cylindrical in shape so as to reduce the friction created by movement of, for example, the magnet 50 thereon. As shown in FIG. 1, the pivot pin 52 may define a longitudinal axis 40 and the magnet may define a central axis 44. In an exemplary embodiment, the magnet 50 may be positioned such that the central axis 44 of the magnet 50 is collinear with the longitudinal axis 40 of the pivot pin 52 and/or such that the pin 52 may extend along the central axis 44 of the magnet 50. The magnet 50 may, thus, rotate about the longitudinal axis 40 of the pin 52.

The base plate 12 may also define at least one passage 20 sized, located, and/or otherwise configured to allow at least a portion of, for example, the shutter blade 16 to pass therethrough. In an exemplary embodiment, the passage 20 may increase the range of motion and/or range of rotation of the shutter blade 16. It is understood that in such an exemplary embodiment, the shutter blade 16 may be prohibited from traveling beyond the passage and/or beyond the outer perimeter of the base plate 12. A portion of the base plate 12 and or the cover 13 may be removed to assist in forming the passage 20.

Figure 2:
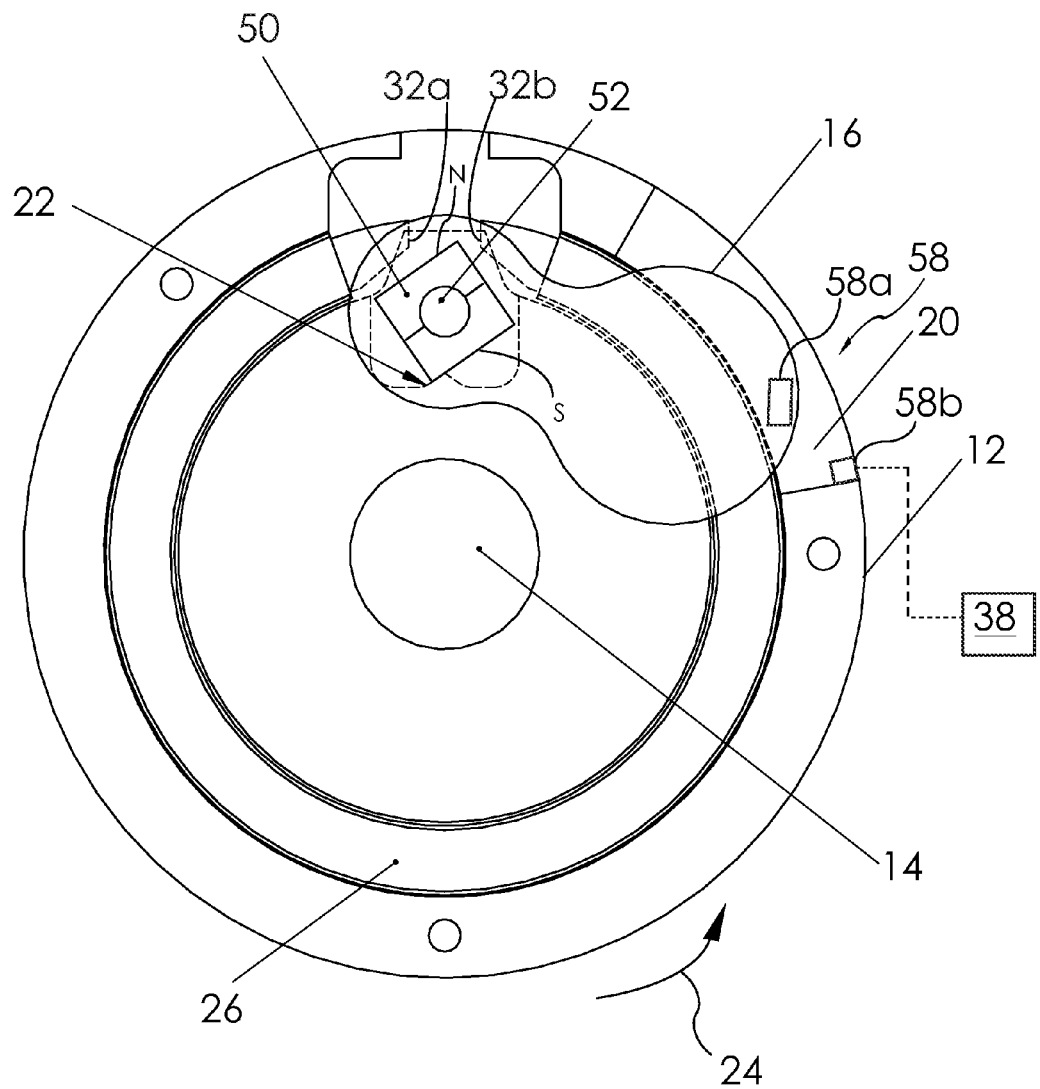
FIG. 2 is a plan view of the shutter assembly shown in FIG. 1 with portions removed.
Figure 3:
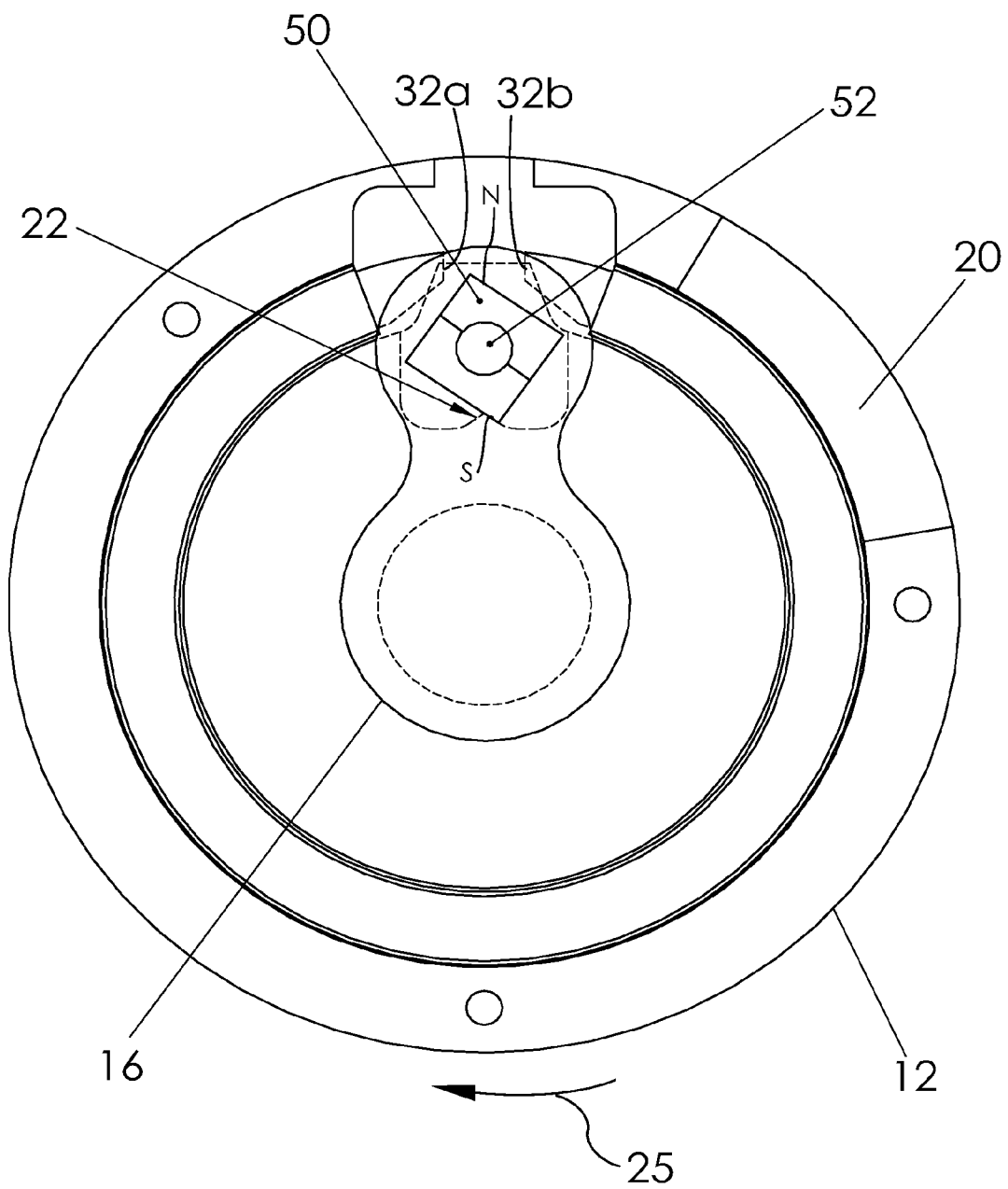
FIG. 3 is an additional plan view of the shutter assembly shown in FIG. 1 with portions removed.

The magnet 50 may be rotatably and/or otherwise movably mounted on or to the pivot pin 52. The magnet 50 may be any type of magnet known in the art such as, for example, a permanent magnet having a north pole and a south pole. The magnet 50 may have any shape, size, and/or other configuration known in the art. For example, the magnet 50 may be sized and/or shaped to facilitate rapid movement of the shutter blades 16. For example, as shown in FIGS. 2 and 3, the magnet 50 may include a flat surface defining a north pole N and another flat surface defining a south pole S. The flat surfaces defining the poles N, S of the magnet 50 may be disposed adjacent to or between operative faces 32a, 32b of the solenoid 26. The magnet 50 may be substantially cube-shaped, and/or any other known three-dimensional shape defining one or more flat or substantially planar surface. For example, the magnet 50 may have a top, a bottom, and at least two sides, and the poles N, S of the magnet 50 may be disposed on two opposite sides of the magnet 50 as is typical.

The magnet 50 may also define at least one aperture 42 sized, shaped, and/or otherwise configured to accept the pivot pin 52. the pin 52 may extend at least partially and/or substantially through the aperture 42. It is understood that rotation of the magnet 50 on or about the pivot pin 52 may assist in transitioning the shutter blade 16 between an open position (FIG. 2) exposing the shutter opening 14 and a closed position (FIG. 3) blocking the shutter opening 14. In particular, the magnet 50 may be configured to move in the direction of arrow 24 (FIG. 2) to transition the shutter blade 16 into the open position, and the magnet 50 may be configured to move in the direction of arrow 25 (FIG. 3) to transition the shutter blades 16 into the closed position. The aperture 42 may be substantially centrally located in the magnet 50 and may extend, for example, from the top of the magnet 50 to the bottom thereof. In an exemplary embodiment in which the magnet 50 is substantially cube-shaped, the aperture 42 may extend substantially parallel to each side of the magnet 50.

Contact between the base plate 12 and the magnet 50 may limit, for example, rotation and/or other movement of the magnet 50. Impact between the magnet 50 and the base plate 12 may limit the rotation of the magnet 50 in, for example, the direction of arrow 24 and in the opposite direction of arrow 25. For example, the magnet 50 may impact the base plate 12 at the open and closed positions thereby limiting the rotation thereof. The shutter assembly 10 may also include at least one stop 22 configured to limit and/or restrict the movement of the magnet 50 in the direction of arrows 24 and 25. The stop 22 may be any structure known in the art configured to limit and/or restrict the movement of a movable structure disposed proximate thereto. The stop 22 may be formed by the base plate 12. Alternatively, the stop 22 may be rigidly mounted on and/or connected to the base plate 12. In such an exemplary embodiment, the stop 22 may be made from the same or similar materials used to form the base plate 12. The stop 22 may further comprise any dampening material known in the art such as, for example, rubber, plastics, and/or polymers. The stop 22 may be made from such materials, or such damping materials may be desirably connected to the stop 22 in typical locations for damping the impact of, for example, the magnet 50. The stop 22 may be substantially non-brittle and may be configured to tolerate repeated impacts with one or more moving parts such as, for example, the magnet 50 of the shutter assembly 10.

In an exemplary embodiment, the stop 22, the base plate 12, and/or the magnet 50 may include one or more dampers (not shown) configured to limit and/or otherwise restrict the rotation of the magnet 50 about the pivot pin 52. The dampers may be impact dampers positioned and/or otherwise configured to damp impact between the magnet 50, and the base plate 12 and/or the stop 22. The impact dampers may soften the impact of the magnet 50 as it transitions the shutter blade 16 between the open position and the closed position. Such dampers may be connected to at least one of the base plate 12, the stop 22, and the magnet 50.

The stop 22 may have any shape, size, and/or other configuration known in the art configured to assist in limiting movement of and/or dampening impact of the magnet 50. For example, as shown in FIGS. 1-3, the stop 22 may comprise first and second substantially planar sides connected at an apex. The magnet 50 may contact and/or impact the stop 22 at the open and closed positions. For example, the magnet 50 may impact the first side of the stop 22 at the open position and may impact the second side of the stop 22 at the closed position. The magnet 50 may be isolated from contact with the stop 22 between the open and closed positions.

The shutter blade 16 may be made from, for example, hardened aluminum, cold-rolled steel, stainless steel, titanium, and/or any other metal or alloy commonly used in shutters for photographic, scientific, or calibration applications. The shutter blade 16 can have any shape, size, and/or other configuration known in the art. The shutter blade 16 can be, for example half-moon shaped, teardrop shaped, substantially triangular, substantially square, substantially rectangular, and/or any other shape known in the art. The shutter blade 16 may preferably be as thin as possible so as to reduce a profile of the shutter assembly 10. For example, the shutter blade 16 may be substantially planar.

The shutter blade 16 may define an opening sized, shaped, and/or otherwise configured to fit over the sides or flat surfaces of the magnet 50. In an exemplary embodiment, the shutter blade 16 may be press fit onto the magnet 50 such that the sides or flat surfaces of the magnet 50 contact the shutter blade 16 to assist in the transition between the open and closed positions. For example, one or more sides or surfaces of the magnet 50 may impart a driving force to the portion of the shutter blade 16 contacting the sides or surfaces.

Light may be selectively occluded from passing through, and may be allowed to pass through the shutter opening 14 by rotating, pivoting, and/or otherwise moving the shutter blade 16 across the shutter opening 14. The shutter blade 16 preferably moves in a shutter plane normal to the central axis 36 of the shutter opening 14. Although FIGS. 1-3 illustrate an embodiment of the shutter assembly 10 having only a single shutter blade 16, it is understood that additional exemplary embodiments may include 2, 3, 4, or more shutter blades 16 configured to selectively occlude light from passing through the shutter opening 14 as described herein with respect to the single shutter blade 16.

Such exemplary embodiments may include a corresponding number of additional permanent magnets 50 pivotably and/or rotatably mounted on the base plate 12. Such additional shutter blades 16 may be mounted on the corresponding additional permanent magnets 50 as described above. In addition, the base plate 12 may include a corresponding number of additional pivot pins 52 configured to rotatably support the magnets 50. Such exemplary shutter assemblies may also include a corresponding change in the configuration of the solenoid 26. For example, a plurality of arc-shaped solenoids 26 may be disposed within the channel 18 of the base plate 12 to control motion of the additional magnets 50 and shutter blades 16.

Figure 4:
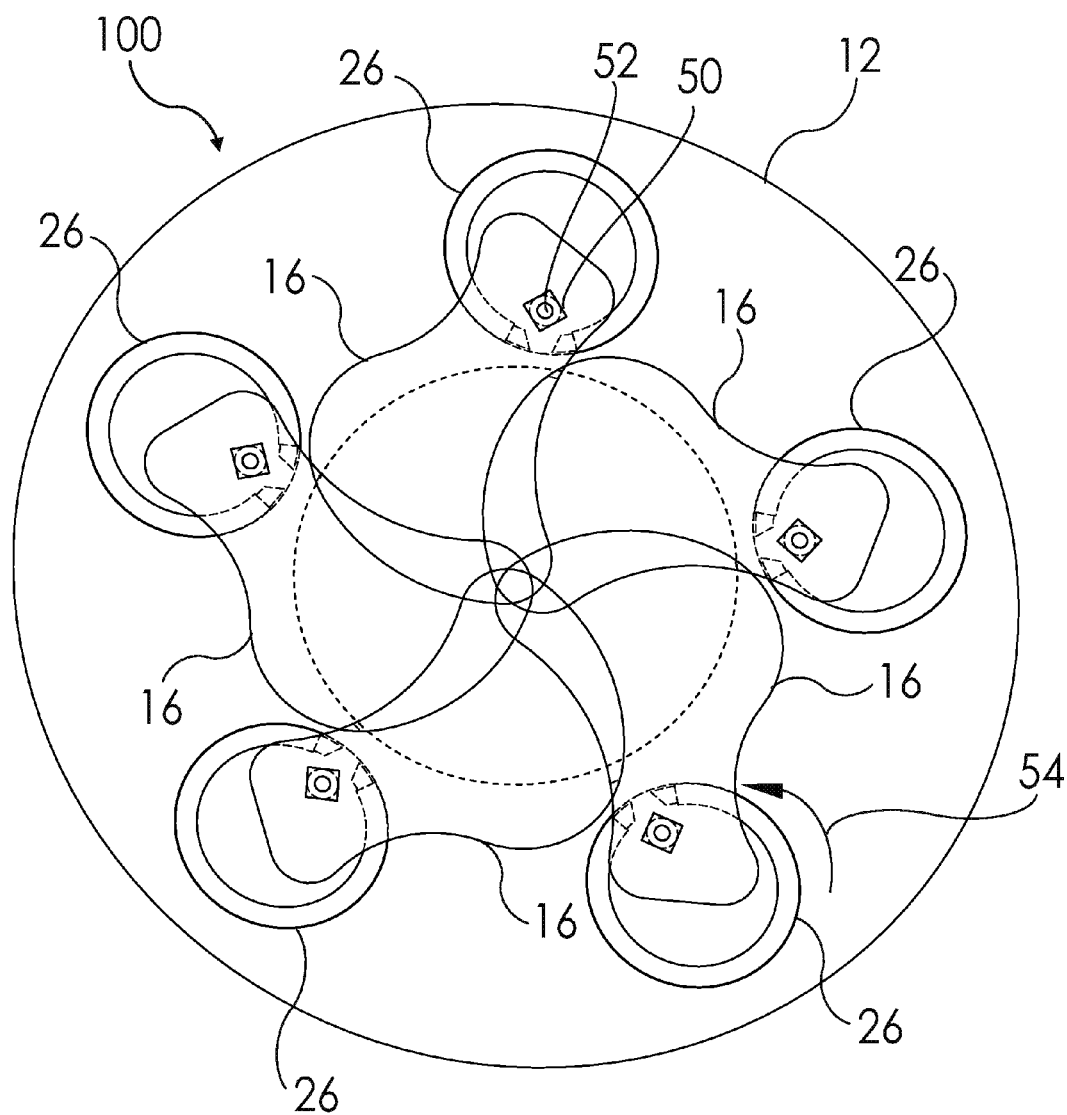
FIG. 4 is a plan view of a shutter assembly, with portions removed, according to another exemplary embodiment of the present disclosure.
Figure 5:
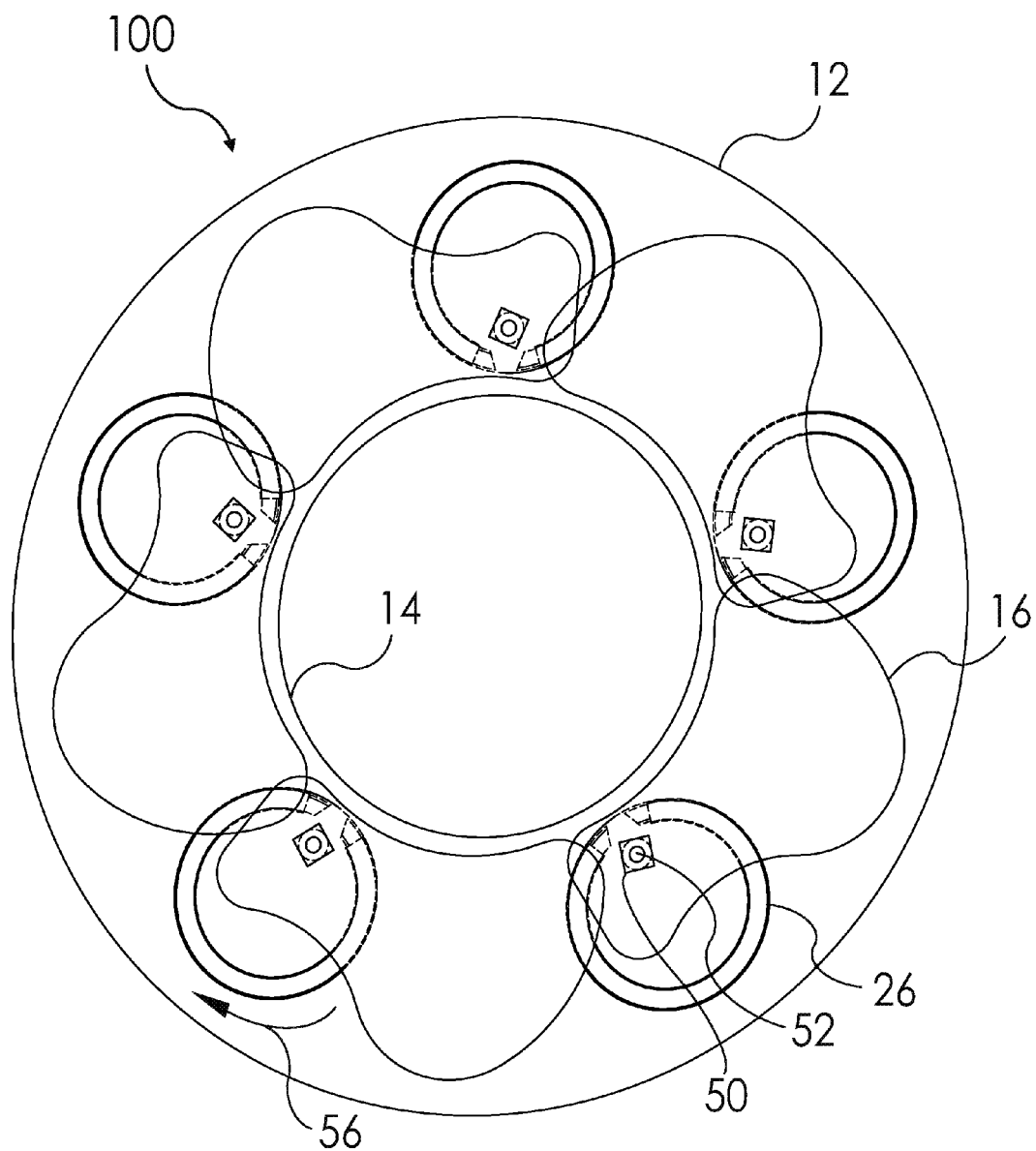
FIG. 5 is an additional plan view of the shutter assembly shown in FIG. 4 with portions removed.

For example, as illustrated in FIGS. 4 and 5, an exemplary shutter assembly 100 may include five or more shutter blades 16, each mounted to a corresponding permanent magnet 50 as described above. Each magnet 50 may be pivotably and/or rotatably mounted on a corresponding pivot pin 52 formed by and/or otherwise connected to the base plate 12. The shutter assembly 100 may include a corresponding number of solenoids 26 disposed on the base plate 12 proximate the magnets 50. The solenoids 26 may be disposed on a surface of the base plate 12 or, for example, within a channel (FIG. 1) of the base plate 12 sized and/or otherwise configured to house multiple solenoids 26. It is understood that, in an exemplary embodiment, the base plate 12 may define a dedicated recess or channel for each of the solenoids 26 employed by the shutter assembly 100.

In an exemplary embodiment of the shutter assembly 100, the base plate 12 may also define, for example, a stop 22 corresponding to each solenoid 26, and the motion of the magnets 50 and shutter blades 16 may be limited by the base plate 12 and/or the stops 22 as described herein with respect to the shutter assembly 10. For clarity, the exemplary stops 22 have been omitted from FIGS. 4 and 5. In such an exemplary embodiment, the magnets 50 may impact and/or contact the base plate 12 and/or the stops 22 at the closed position (illustrated in FIG. 4) by traveling in the direction of arrow 54. Likewise, the magnets 50 may impact and/or contact the base plate 12 and/or the stops 22 at the open position (illustrated in FIG. 5) by traveling in the direction of arrow 56. In such an exemplary embodiment, the surface of the respective magnets 50 impacting and/or contacting the base plate 12 and/or the stops 22 at the open and closed positions may be isolated from contact with the base plate 12 and/or the stops 22 between the open and closed positions. Thus, other than the number, size, and/or location of shutter blades 16, solenoids 26, and/or stops 22, the shutter assembly 100 may function similar to the shutter assembly 10.

The permanent magnet 50 and the solenoid 26 shown in FIGS. 1-3 preferably cooperate to actuate the shutter blade 16. The solenoid 26 may be made up of a wire 28 wound about a core 30. In the exemplary embodiment illustrated in FIG. 1, the solenoid 26 is generally arcuate and has an inner diameter larger than the diameter of the shutter opening 14. Accordingly, the solenoid 26 can be mounted on the base plate 12, and may be disposed in the shutter assembly 10 about the shutter opening 14 without interfering with the shutter opening 14. The solenoid 26 may be disposed at least partially within the channel 18 as described above. In an exemplary embodiment of the present disclosure, the solenoid 26 can be substantially C-shaped and may span more than approximately 270-degrees about the central axis 36. The substantial C-shape terminates at operative faces 32a, 32b. The operative faces 32a, 32b are spaced by a gap 34. At least a portion of the permanent magnet 50 may be disposed in the gap 34 between the first and second operative faces 32a, 32b.

Ends (not shown) of the wire 28 forming the solenoid 26 may also be disposed as leads proximate the first and second operative faces 32a, 32b, and the leads may be connected to a solenoid driver 38. This connection is shown schematically in FIG. 1. When the driver 38 applies a current to the solenoid 26 via the wire 28, the operative faces 32a, 32b become oppositely polarized poles. More specifically, when a first current is applied to the solenoid 26, the first operative face 32a may take on a first polarity, i.e., a north or south polarity, and the second operative face 32b may take on an opposite polarity.

As shown in FIGS. 1-3, the first operative face 32a may face the second operative face 32b, and in such an embodiment, the electromagnetic flux lines of the solenoid 26 may travel substantially directly between the poles defined by the operative faces 32a, 32b. Although not illustrated in FIGS. 1-3, it is understood that the number of turns and/or the length of the wire 28 may define the electromagnetic strength of the poles defined by the operative faces 32a, 32b of the solenoid 26, and the greater the number of turns (i.e., the greater the length) of the coil 28, the more powerful the solenoid 26.

With such a coil configuration, the solenoid 26 may be operable using a much lower voltage than conventional electromagnets. In an exemplary embodiment, the solenoid 26 may provide a relatively large magnetic flux between the poles defined by the operative faces 32a, 32b with a relatively low voltage being supplied thereto. For example, the solenoid 26 may be operable utilizing less than 5 volts of electrical power and, in exemplary embodiments, the solenoid 26 may be operable utilizing less than 3 volts. Reducing and/or substantially minimizing the size of the gap 34 may assist in increasing the power of the solenoid 26. The polarity of each pole of the solenoid 26 may be controllably reversed by the driver 38 to controllably move the magnet 50 within the gap 34 and about the pin 52.

In an exemplary embodiment, the permanent magnet 50 may be arranged with one of its poles disposed substantially in the gap 34 and/or otherwise between the first and second operative faces 32a, 32b of the solenoid 26. In such an embodiment, the opposite pole of the magnet 50 may be disposed substantially away from the gap 34. Although FIGS. 2 and 3 show the north pole N of the magnet 50 disposed between the faces 32a, 32b, it is understood that, in another exemplary embodiment, the south pole S may be disposed therebetween. Unless otherwise specified, the exemplary configuration of FIGS. 2 and 3 will be referred to for the duration of this disclosure for ease of explanation.

As shown in the exemplary embodiment of FIG. 2, applying a current to the solenoid 26 may form a south pole at the face 32a, thereby attracting the north pole N of the magnet 50 thereto. Such a current may also form a north pole at the face 32b, thereby repelling the north pole N of the magnet 50 therefrom. Such an exemplary polarity configuration, and the magnetic field generated thereby, may drive the magnet 50 to rotate about the pivot pin 52 in the direction of arrow 24. The magnet 50 may be driven to rotate in response to this magnetic field until the magnet 50 impacts and/or otherwise contacts the stop 22. Because the shutter blade 16 is mounted on the magnet 50, movement of the magnet 50 drives movement of the shutter blade 16 about the central axis 44 of the magnet 50 and/or about the longitudinal axis 40 of the pivot pin 52 to form the open position of FIG. 2.

To drive the shutter blade to the closed position and thereby occlude light from passing through the shutter opening 14, the driver 38 can be operated to reverse the polarity of the solenoid 26. Reversing the polarity may form a north pole at the first operative face 32a and a south pole at the second operative face 32b. This pole configuration may repel the north pole of the permanent magnet 50 away from the first operative face 32a and may attract the north pole of the permanent magnet 50 to the second operative face 32b. Such an exemplary polarity configuration, and the magnetic field generated thereby, may drive the magnet 50 to rotate about the pivot pin 52 in the direction of arrow 25. The magnet 50 may be driven to rotate in response to this magnetic field until the magnet 50 impacts and/or otherwise contacts the stop 22. Movement of the magnet 50 drives corresponding movement of the shutter blade 16 about the central axis 44 of the magnet 50 and/or about the longitudinal axis 40 of the pivot pin 52 to form the closed position of FIG. 3.

In an exemplary embodiment, delaying the reversal of the current will allow the shutter assembly 10 to remain in the open position for the time of the delay. Conversely, reversing the current soon after opening will cause the shutter assembly 10 to open and close relatively quickly. In addition, components of the shutter assembly 10 may be magnetically damped to avoid slamming of components into each other and/or to otherwise soften the impact of such components. For example, when the permanent magnet 50 is to be moved between the open and closed positions, the movement of the permanent magnet 50 could be slowed by alternating the current applied to the solenoid 26, for example, to alternately attract and repel the permanent magnet 24 as it rotates. For example, as the magnet 50 is about to impact the base plate 12 and/or the stop 22, one or more pulses could be applied to the solenoid 26 to repel the permanent magnet 50. Such pulses may slow the rotational movement of the permanent magnet 50, thereby acting on the permanent magnet 50 as a magnetic brake.

In an additional exemplary embodiment of the present disclosure, the shutter assembly 10 may include one or more feedback sensors 58 configured to assist in controlling the position of the magnet 50 and/or the shutter blade 16. Such sensors 58 may comprise any type of electromagnetic and/or position sensor known in the art. For example, the sensors 58 may comprise a Hall effect sensor, and a portion 58a of the Hall effect sensor may be mounted on and/or proximate to the magnet 50 and/or the shutter blade 16. In such an embodiment, a second portion 58b of the Hall effect sensor may be mounted, for example, on the stop 22, proximate the passage 20 on the base plate 12, or within the passage 20. Such exemplary portions 58a, 58b of the sensors 58 are illustrated in FIG. 2, and it is understood that any of the exemplary sensors 58 and/or portions 58a, 58b described herein may be employed with any of the exemplary shutter assemblies 10, 100 disclosed herein.

Alternatively, the sensors 58 may comprise a current sensor configured to sense the current traveling through the coil 28 of the solenoid 26. In the exemplary embodiments discussed herein, the driver 38 may receive feedback signals produced by the one or more sensors 58. The signals may be indicative of a change in current travelling through the solenoid 26 as a result of the rotational position of the magnet 50 within the gap 34 and/or the position of the shutter blade 16 relative to the passage 20 or the stop 22. Alternatively, the signals may be indicative of the rotational and/or other position of the magnet 50 and/or the shutter blade 16 relative to, for example, the base plate 12. The driver 38 may then alter the current and/or voltage directed to the solenoid 26 to control the rotational position, speed, and/or movement of the magnet 50 and/or the shutter blade 16.

In still another exemplary embodiment, the sensors 58 may comprise a micromagnet mounted to the shutter blade 16 and a corresponding transponder mounted to a stationary component of the shutter assembly 10. In such an exemplary embodiment, the transponder may detect the relative position of the micromagnet. In still a further embodiment, the sensors 58 may comprise a flag or other structure mounted to the magnet 50 or the shutter blade 16, and a corresponding sensor configured to detect the position of the flag. In such exemplary embodiments, the driver 38 may receive feedback from the one or more sensors 58 based on the change in position of the sensor components. In each of the embodiments discussed above, the feedback received from the sensors 58 may be utilized to detect and/or otherwise assist in controlling the rotational position of the magnet 50, thereby controlling the position of the shutter blade 16.

In another exemplary embodiment, the solenoid 26 may be configured to produce a variable and/or otherwise controllable magnetic field between the first and second operative faces 32a, 32b and/or proximate the gap 34. Accordingly, the solenoid 26 may be configured to variably control motion and/or movement of the magnet 50 and of the shutter blade 16. In particular, the solenoid 26 may be controlled to desirably position the magnet 50 within the gap 34. The solenoid 26 may also be controlled to magnetically accelerate and/or magnetically decelerate movement of the magnet 50 while transitioning the shutter blade 16 between the open and closed positions.

For example, an electrical signal applied to the solenoid 26 may be increased, reduced, and/or otherwise varied. In particular, an electrical current or electrical voltage provided to the solenoid 26 may be reduced, increased, varied, modified, and/or otherwise modulated to control the movement of the magnet 50 relative to, for example, the operative faces 32a, 32b, the one or more dampers, and/or the stop 22. Such variations may, for example, cause a related and corresponding variation in the electrical field created by the solenoid 26 between the first and second operative faces 32a, 32b.

In an exemplary embodiment, varying the electrical current applied to the solenoid 26 may include reversing a polarity of the current supplied thereto. The polarity of the electrical current may be alternated and/or otherwise repeatedly reversed during the transition of the shutter blade 16 between the open and closed positions. Such a variation in the current may cause a corresponding variation in the magnetic field created between the first and second magnetic poles of the solenoid 26, and may cause the magnet 50 to accelerate and/or decelerate as it rotates. For example, the polarity of the electrical current may be reversed at least once and/or repeatedly during the transitioning to magnetically dampen the movement of the magnet 50. Such variations in the electrical current and such corresponding variations in the magnetic field may alternately attract and repel the permanent magnet 50 as the permanent magnet 50 rotates between the operative faces 32a, 32b.

Such variations in current, magnetic field, voltage, and/or polarity may be controlled by the user as desired in order to produce a variable shutter opening and/or shutter closing pattern as necessary for different shutter assembly applications. For example, the shutter blade 16 may be controlled to accelerate and/or decelerate while transitioning between the open and closed positions. Such accelerations may be, for example, linear, stepwise, and/or exponential. Alternatively, the shutter blade 16 may be controlled during the transitioning to have any other velocity, acceleration, and/or movement pattern useful in shutter applications. It is also understood that the movement of the shutter blade 16 may cause a corresponding change in the area of the shutter opening 14 exposed by the shutter assembly 10. Thus, the area of the shutter opening 14 that is exposed by the shutter assembly 10 may be varied, for example, in a linear, stepwise, exponential, and/or other manner as dictated by the controlled movement of the shutter blade 16.

It is also understood that the acceleration, deceleration, and/or other movement of the magnet 50 and/or the shutter blade 16 may be controlled using a closed loop feedback control strategy. For example, the shutter assembly 10 may be servo-driven to assist in accelerating, decelerating, and/or otherwise modifying the movement of the shutter blade 16 while transitioning the shutter blade 16 between the open and closed positions. It is understood that the shutter assembly 10 may comprise any combination of sensors, sensor components, and/or other devices to facilitate the closed loop control of the position and/or movement of, for example, the permanent magnet 50, and/or the shutter blade 16.

In an exemplary embodiment of the present disclosure, the shutter assembly 10 may be used in a wide variety of photographic device applications. For example, the shutter assembly 10 may be utilized to expose photographic film to light for a desired period of time, thereby forming an image on the film. In such an application, the shutter assembly may be utilized in a camera or other like photographic device.

Other embodiments of the disclosed shutter assembly will be apparent to those skilled in the art from consideration of this specification. It is intended that this specification and examples be considered as exemplary only, with the true scope of the invention being indicated by the following claims.

The invention claimed is:

1. A shutter assembly, comprising:
a base having a stop and a central aperture;
a permanent magnet rotatably mounted on the base; and
a shutter blade directly mounted on the magnet and configured to move between an open position exposing the aperture and a closed position blocking the aperture, the magnet contacting the stop in the open and closed positions, and being isolated from contact with the stop between the open and closed positions.

2. The assembly of claim 1, wherein contact between the magnet and the stop limits rotation of the magnet.

3. The assembly of claim 1, wherein contact between the magnet and the stop limits rotation of the shutter blade.

4. The assembly of claim 1, wherein the magnet impacts the stop at the open and closed positions.

5. A shutter assembly, comprising:
a base having a central aperture;
a rotating permanent magnet defining a top, a bottom, and at least two sides,
the base further including a stop proximate the least two sides of the magnet,
the magnet being in communication with the base such that contact between one of the at least two sides and the stop limits rotation of the magnet in a first direction, and in a second direction opposite the first direction; and
a shutter blade mounted on the magnet and configured to move between an open position exposing the aperture and a closed position blocking the aperture.

6. The assembly of claim 5, wherein the base includes a pin and the magnet defines a central axis, the pin extending along the central axis of the magnet.

7. The assembly of claim 5, wherein the base includes a pin and the magnet includes an aperture, the pin extending substantially through the aperture of the magnet.

8. The assembly of claim 5, wherein the base includes a pin extending substantially perpendicular from the base, the magnet being rotatably mounted on the pin.

9. The assembly of claim 5, further including an impact damper positioned to damp impact between the magnet and the base.

10. The assembly of claim 9, wherein the impact damper is connected to one of the base and the magnet.

11. A shutter assembly, comprising:
a base defining a central aperture and a pin extending substantially perpendicular to the base;
a permanent magnet pivotably mounted on the pin; and
a shutter blade mounted on the magnet and movable between an open position exposing the aperture and a closed position blocking the aperture, the magnet impacting a stop formed by the base at the open and closed positions, and being isolated from contact with the stop between the open and closed positions.

12. The assembly of claim 11, wherein a surface of the magnet imparts a driving force to a portion of the shutter blade contacting the surface.

13. The assembly of claim 11, wherein impact between the magnet and the base limits the rotation of the magnet in a first direction.

14. The assembly of claim 13, wherein impact between the magnet and the base limits rotation of the magnet in a second direction opposite the first direction.

15. The assembly of claim 11, wherein a central axis of the magnet is collinear with a longitudinal access of the pin, and the magnet rotates about the longitudinal axis of the pin.

16. The assembly of claim 11, wherein the shutter blade is press fit onto the magnet.

17. The assembly of claim 11, wherein the stop comprises first and second substantially planar sides connected at an apex, the magnet impacting the first side at the open position and impacting the second side at the closed position.

18. The assembly of claim 11, wherein the magnet is disposed between poles of an electromagnetic coil mounted on the base.

19. The assembly of claim 18, wherein the magnet is driven to rotate in response to a magnetic field generated by the electromagnetic coil.

20. The assembly of claim 11, wherein the magnet is substantially cube-shaped.

21. The assembly of claim 11, wherein the shutter blade is substantially planar and substantially teardrop-shaped.

22. The assembly of claim 11, further comprising a second permanent magnet pivotably mounted on the base; and a second shutter blade mounted on the second magnet, the second shutter blade being movable between an open position exposing the aperture and a closed position blocking the aperture.

23. The assembly of claim 11, further including a feedback sensor disposed proximate the base to determine a position of one of the permanent magnet and the shutter blade.

24. The assembly of claim 23, further including an electromagnetic coil mounted on the base, and a driver operably connected to the electromagnetic coil, the driver directing an electrical current to the electromagnetic coil in response to a signal received from the feedback sensor indicative of the position.

25. The assembly of claim 11, further including a substantially circular electromagnetic coil disposed on the base substantially surrounding the aperture.

26. The assembly of claim 25, wherein the electromagnetic coil defines poles of opposite polarity and the magnet is rotatably disposed between the poles.

* * * * *